United States Patent
Liu et al.

(10) Patent No.: US 10,002,106 B2
(45) Date of Patent: Jun. 19, 2018

(54) HANDSHAKING METHOD OF HYBRID HARD-DISK DRIVE

(71) Applicant: ALLONE SOLUTION CO., LTD., Hsinchu (TW)

(72) Inventors: Shu-Min Liu, Hsinchu (TW); Ssu-Wen Hung, Hsinchu (TW)

(73) Assignee: ALLONE SOLUTION CO., LTD., Hsinchu (TW)

( * ) Notice: Subject to any disclaimer, the term of this patent is extended or adjusted under 35 U.S.C. 154(b) by 192 days.

(21) Appl. No.: 15/134,368

(22) Filed: Apr. 20, 2016

(65) Prior Publication Data
US 2017/0308500 A1 Oct. 26, 2017

(51) Int. Cl.
| G06F 13/36 | (2006.01) |
| G06F 13/42 | (2006.01) |
| G06F 3/06 | (2006.01) |
| G06F 13/40 | (2006.01) |
| G06F 13/28 | (2006.01) |

(52) U.S. Cl.
CPC ........ *G06F 13/4286* (2013.01); *G06F 3/0611* (2013.01); *G06F 3/0659* (2013.01); *G06F 3/0685* (2013.01); *G06F 13/28* (2013.01); *G06F 13/4059* (2013.01)

(58) Field of Classification Search
CPC .... G06F 13/4286; G06F 13/28; G06F 3/0611; G06F 3/0659; G06F 3/0685; G06F 13/4059
See application file for complete search history.

(56) References Cited

U.S. PATENT DOCUMENTS

| 5,712,986 A | 1/1998 | Vo | |
| 6,108,713 A * | 8/2000 | Sambamurthy | H04L 29/06 370/463 |

(Continued)

FOREIGN PATENT DOCUMENTS

| TW | 457444 B | 10/2001 |
| TW | I475386 B | 3/2015 |

OTHER PUBLICATIONS

Office Action dated Feb. 22, 2017 of the corresponding Taiwan patent application.

*Primary Examiner* — Jing-Yih Shyu
(74) *Attorney, Agent, or Firm* — Chun-Ming Shih; HDLS IPR Services

(57) ABSTRACT

A handshaking method adopted by a hybrid HDD has a bridge unit and multiple storages is disclosed. The bridge unit pre-sends $X\_RDY_p$ signal of a first packet of a command to one of the storages when a bus is in an idle state, and receives $R\_RDY_p$ signal from the storage. After receiving $X\_RDY_p$ signal from a host, the bridge unit immediately sends the $R\_RDY_p$ signal to the host. The bridge unit then receives other signals from the host continually and sends them to the storage. After the first packet is completely transmitted, the bridge unit pre-sends $X\_RDY_p$ signal of next packet, without waiting for the host or the storage to initiate transmitting the next packet, so as to reduce the handshaking time.

9 Claims, 10 Drawing Sheets

(56) References Cited

U.S. PATENT DOCUMENTS

| | | | |
|---|---|---|---|
| 6,396,887 B1 * | 5/2002 | Ware | G06F 1/12 327/144 |
| 8,321,662 B2 | 11/2012 | Hazlewood et al. | |
| 2004/0100944 A1 * | 5/2004 | Richmond | H04L 45/02 370/360 |
| 2008/0098061 A1 * | 4/2008 | Zheng | G09B 5/00 709/202 |
| 2013/0305009 A1 * | 11/2013 | Durant | G06F 9/5016 711/170 |

* cited by examiner

HANDSHAKING METHOD OF HYBRID HARD-DISK DRIVE

BACKGROUND OF THE INVENTION

1. Field of the Invention

The present invention relates to a handshaking method, and in particularly to a handshaking method of hybrid hard-disk drive.

2. Description of Prior Art

FIG. 1A is a schematic view showing data accessing of prior art. The skilled person in this field knows, the time cost that a host 1 (such as a computer) reads data from or writes data to a hard-disck drive 2 (HDD 2) comprises actual data transmission time, and also comprises handshaking time of executing handshake procedure between the host 1 and the HDD 2.

Taking the most popular bus interface, serial advanced technology attachment (SATA), for an instance, SATA can provide the bus speed of about 6 Gbps, however, the practical efficiency of SATA is only about 540-560 MB/s, which is calculated by the following formula:

$$\frac{\text{data transmission time}}{\text{data transmission time} + \text{handshaking time}} * \text{bus speed}$$

FIG. 1B is a time sequence diagram showing packet transmission of prior art. As shown in FIG. 1B, an instance of transmitting a first packet of a command (such as a read command or a write command) is disclosed.

When transmitting the above packet, the host 1 first transmits a transmission data ready ($X\_RDY_p$) signal, and the HDD 2 can receive the $X\_RDY_p$ signal after a first bus delay. The HDD 2 then replies to the host 1 with a receiver ready ($R\_RDY_p$) signal, and the host 1 can receive the $R\_RDY_p$ signal after a second bus delay. Then, the host 1 transmits a data packet (Data).

The HDD 2 can receive the data packet after a third bus delay, and then replies to the host 1 with a reception in progress ($R\_IP_p$) signal. After the data packet is completely transmitted, the host 1 transmits a wait for frame termination ($WTRM_p$) signal. The HDD 2 can receive the $WTRM_p$ after a fourth bus delay, and then replies a reception with no error ($R\_OK_p$) signal to the host 1.

The host 1 can receive the $R\_OK_p$ signal after a fifth bus delay, and then sends a synchronization ($SYNC_p$) signal (not shown). The HDD 2 can receive the $SYNC_p$ signal after a sixth bus delay, and then ends the transmission action of this packet. FIG. 1B can tell that the transmission time of the packet is the sum of the first bus delay, the second bus delay, the fourth bus delay, the fifth bus delay, the sixth bus delay and the transmission time of the data packet (it should be mentioned that the third bus delay is overlapped with the transmission time of the data packet, so the third bus delay is not counted in the total transmission time of the packet), in other words, the handshaking time of this packet at least comprises five bus delays. In particularly, the host 1 and the HDD 2 may not always stay in the status ready to receive the packet, so the practical time cost of the handshake procedure may exceed aforementioned five bus delays.

FIG. 2 is a schematic view of hybrid HDD of related art. Considering the access speed of traditional HDD cannot compete with the data transmission speed of current bus interface (such as SATA), a kind of hybrid HDD 3 is provided in the market recently, wherein the hybrid HDD 3 comprises a bridge unit 31 and multiple storages 32, and the multiple storage 32 at least comprises a volatile memory 321 (such as DRAM) and a HDD 322.

When the host 1 connects with the hybrid HDD 3 for reading data from/writing data to the hybrid HDD 3, the bridge unit 31 determines to access the volatile memory 321 or the HDD 322 according to position, size, type, etc. of the read/written data. Therefore, the hybrid HDD 3 can optimize the data accessing speed of the entire hybrid HDD 3 by using the volatile memory 321. However, due to the additional control procedure of the bridge unit 31, the hybrid HDD 3 and the host 1 will take a long time to execute the handshake procedure, which is longer than the time cost of the regular handshake procedure between the aforementioned HDD 2 and the host 1.

FIG. 3 is a time sequence diagram showing packet transmission of related art. As shown in FIG. 3, the bridge unit 31 comprises a bridge unit device side 311 for communicating with the host 1 and a bridge unit host side 312 for communicating with each of the storages 32. In the embodiment shown in FIG. 3, a case that the host 1 transmits a first packet of a command to one of the storages 32 is taken for an instance.

When transmitting the packet, the host 1 first transmits a transmission data ready ($X\_RDY_p$) signal, and the bridge unit host side 312 can receive the $X\_RDY_p$ signal after a first combined delay. The combined delay is the sum of the bus delay during which the host 1 transmits the signal to the bridge unit 31 and the delay of the bridge unit 31 itself. The bridge unit host side 312 then transmits the $X\_RDY_p$ signal, and the storage 32 can receive the $X\_RDY_p$ signal after a first bus delay.

The storage 32 then replies a receiver ready ($R\_RDY_p$) signal, and the bridge unit device side 311 can receive the $R\_RDY_p$ signal after a second combined delay. The bridge unit device side 311 then transmits the $R\_RDY_p$ signal, and the host 1 can receive the $R\_RDY_p$ signal after a second bus delay, and transmits a data packet after that.

The bridge unit host side 312 can receive the data packet after a third combined delay, and then transmits the data packet. The storage 32 can receive the data packet after a third bus delay, and replies a reception in progress ($R\_IP_p$) signal after that. Similarly, the bridge unit device side 311 can receive the $R\_IP_p$ signal, and transmits it to the host 1. However, the transmission action of the packet is not affected by the transmitting and the receiving of the $R\_IP_p$ signal, so the transmission time of the $R\_IP_p$ signal is not counted in the total transmission time of the packet.

After the data packet is completely transmitted the host 1 transmits a wait for frame termination ($WTRM_p$) signal, and the bridge unit host side 312 can receive the $WTRM_p$ signal after a fourth combined delay. Then, the bridge unit host side 312 transmits the $WTRM_p$ signal. The storage 32 can then receive the $WTRM_p$ signal after a fourth bus delay, and replies a reception with no error ($R\_OK_p$) signal.

The bridge unit device side 311 can receive the $R\_OK_p$ signal after a fifth combined delay, and then transmits the $R\_OK_p$ signal. The host 1 can receive the $R\_OK_p$ signal after a fifth bus delay, and then transmits a synchronization ($SYNC_p$) signal (not shown). The bridge unit device side 311 can receive the $SYNC_p$ signal after a sixth bus delay, and then completes the communication with the host 1. The bridge unit host side 312 can receive the $SYNC_p$ signal after a sixth combined delay, and then transmits the $SYNC_p$ signal. The storage 32 can receive the $SYNC_p$ signal after a seventh bus delay, and then ends the transmission action of the packet.

As shown in FIG. 3, the total transmission time of the packet is the sum of the first bus delay, the second bus delay, the fourth bus delay, the fifth bus delay, the sixth bus delay, the seventh bus delay, the first combined delay, the second combined delay, the fourth combined delay, the fifth combined delay, the sixth combined delay and the transmission time of the data packet (the third bus delay and the third combined delay are overlapped with the transmission time of the data packet, so they are not counted in the transmission time of the packet). That is to say, the handshaking time of the packet comprises six bus delays and five combined delays.

According to the above description, the hybrid HDD of the related art takes considerable handshaking time. For some short-length read commands (for example, the commands for reading a pile of distributed files), the ratio of the handshaking time in the total transmission time of the commands is very high, and the transmission efficiency is lower as the handshaking time is longer. As a result, if the handshaking time can be reduced effectively, the transmission efficiency of transmitting distributed files will apparently increases.

SUMMARY OF THE INVENTION

The main object of the present invention is to provide a handshaking method of hybrid hard-disk drive, which can pre-execute handshaking without waiting for the initiation of host or storage, so as to reduce handshaking time.

To achieve the above object, the present invention discloses a handshaking method adopted by a hybrid HDD having a bridge unit and multiple storages. The bridge unit pre-sends $X\_RDY_p$ signal of a first packet of a command to one of the storages when a bus is in an idle state, and receives $R\_RDY_p$ signal from the storage. After receiving $X\_RDY_p$ signal from a host, the bridge unit immediately sends the $R\_RDY_p$ signal back to the host. The bridge unit then receives other signals sent from the host continually and sends them to the storage.

After the first packet is completely transmitted, the bridge unit pre-sends $X\_RDY_p$ signal of next packet, without waiting for the host or the storage to initiate transmitting the next packet. Therefore, the handshaking time is effectively reduced.

Compared with related art, the technical effect of the present invention is that the bridge unit are substituted for a source terminal (one of the host and the storage) to pre-send first signal of a transmitted packet to a destination terminal (other one of the host and the storage), and pre-receives a response from the destination terminal before the source terminal initiates the transmission action of transmitting the packet. Therefore, when the source terminal initiates the transmission action of the packet, it can be done immediately, so as to reduce the time cost of the handshake procedure, and reduces the total transmission time of the packet.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 4:
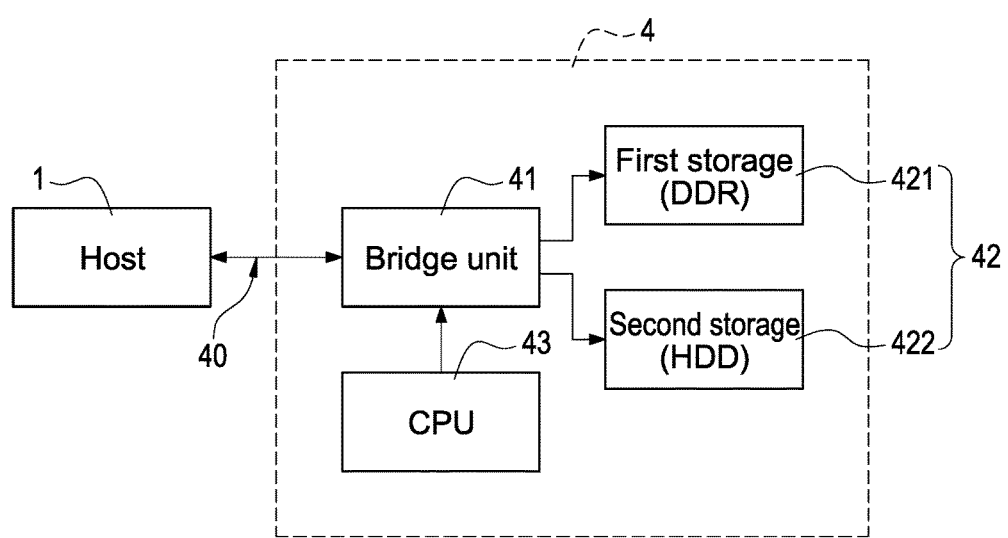
FIG. 4 is a block diagram of hybrid hard-disk drive of a first embodiment according to the present invention.

FIG. 4 is a block diagram of hybrid hard-disk drive of a first embodiment according to the present invention. The present invention discloses a handshaking method, which is adopted by a hybrid hard-disk drive 4 (HDD 4). The hybrid HDD 4 connects with a host 1 through a bus 40, so as to execute handshake procedures and to transmit data with the host 1. In this embodiment, the bus 40 is a serial advanced technology attachment (SATA) bus interface, but not limited thereto.

As shown in FIG. 4, the hybrid HDD 4 comprises a bridge unit 41, multiple storages 42 and a central processing unit 43 (CPU 43). In this embodiment, the multiple storage 42 at least comprises a first storage 421 and a second storage 422; the bridge unit 41 and the CPU 43 can be integrated into a single integrated circuit (IC), but not limited thereto.

In one of the preferred embodiments, the bridge unit 41 connects with the first storage 421 through a first internal bus, and connects with the second storage 422 through a second internal bus, wherein the first internal bus and the second internal bus can be of the same type (such as SATA bus interfaces). The bridge unit 41 is preferably a cross SATA bridge (CSB).

In this embodiment, the first storage 421 can be a volatile storage which is composed of multiple double data rate synchronous dynamic random access memories (DDR SDRAMs), and the second storage 422 can be a non-volatile storage, such as a regular hard disk drive (HDD) or a solid-state disk (SSD). However, the above description is just preferred embodiments of the present invention, not intended to limit the scope of the present invention.

The hybrid HDD 4 further comprises a controller (not shown) connecting with the first storage 412, which is used to transform data and commands related to the first storage 421 to render the data and commands feasible to be processed by the first storage 421. Also, the controller, the bridge unit 41 and the CPU 43 can be integrated into the same IC.

The CPU 43 is used to notify the bridge unit 41 of addresses for each data. Therefore, when receiving data or commands through the bus 40 from the host 1, the bridge unit 41 can determine to write the received data to the first storage 421 or the second storage 422, and determines to read data from the first storage 421 or the second storage 422 according to the received commands.

Figure 5A:
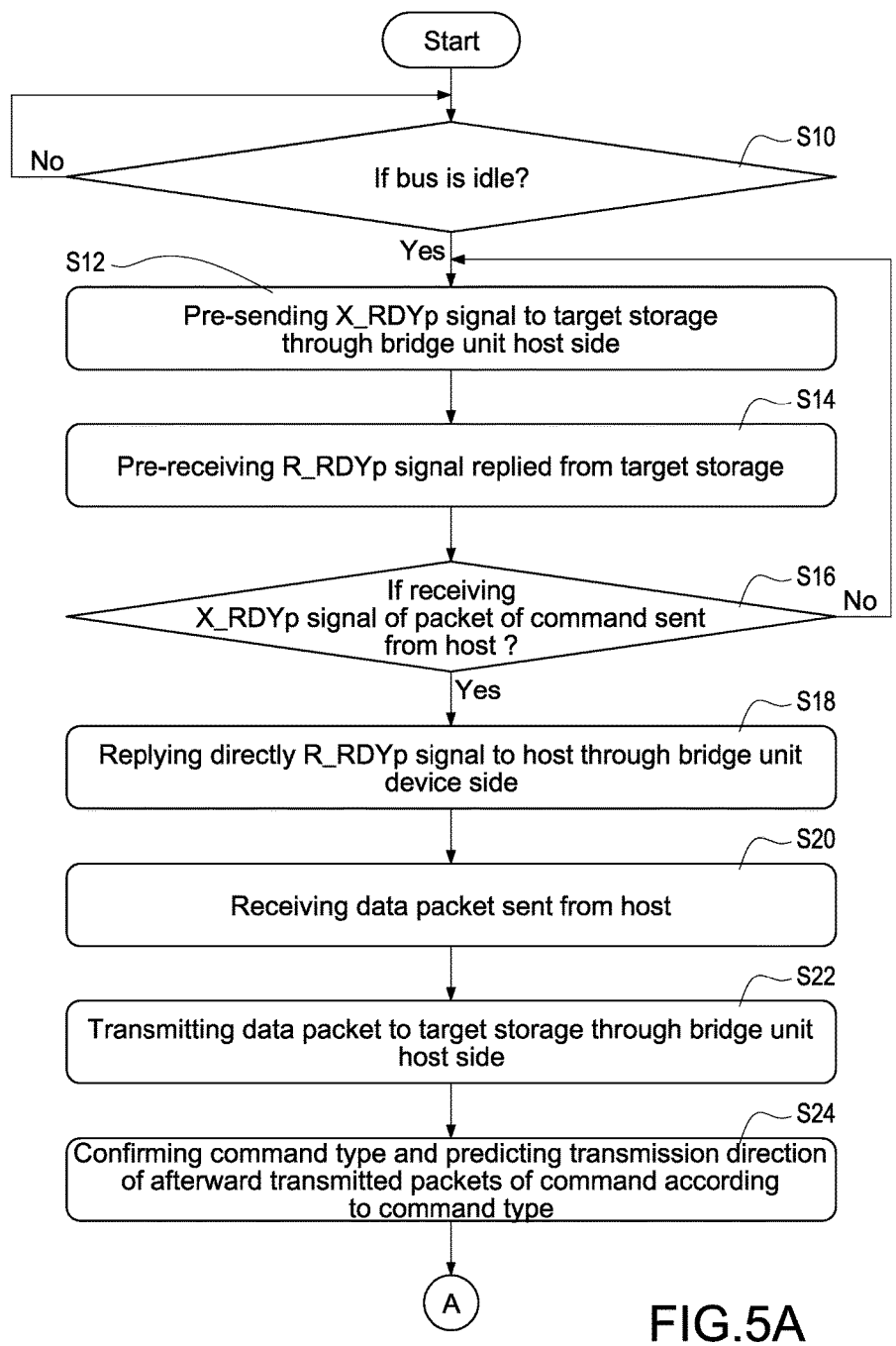
FIG. 5A is a first handshaking flowchart of a first embodiment according to the present invention.
Figure 5B:
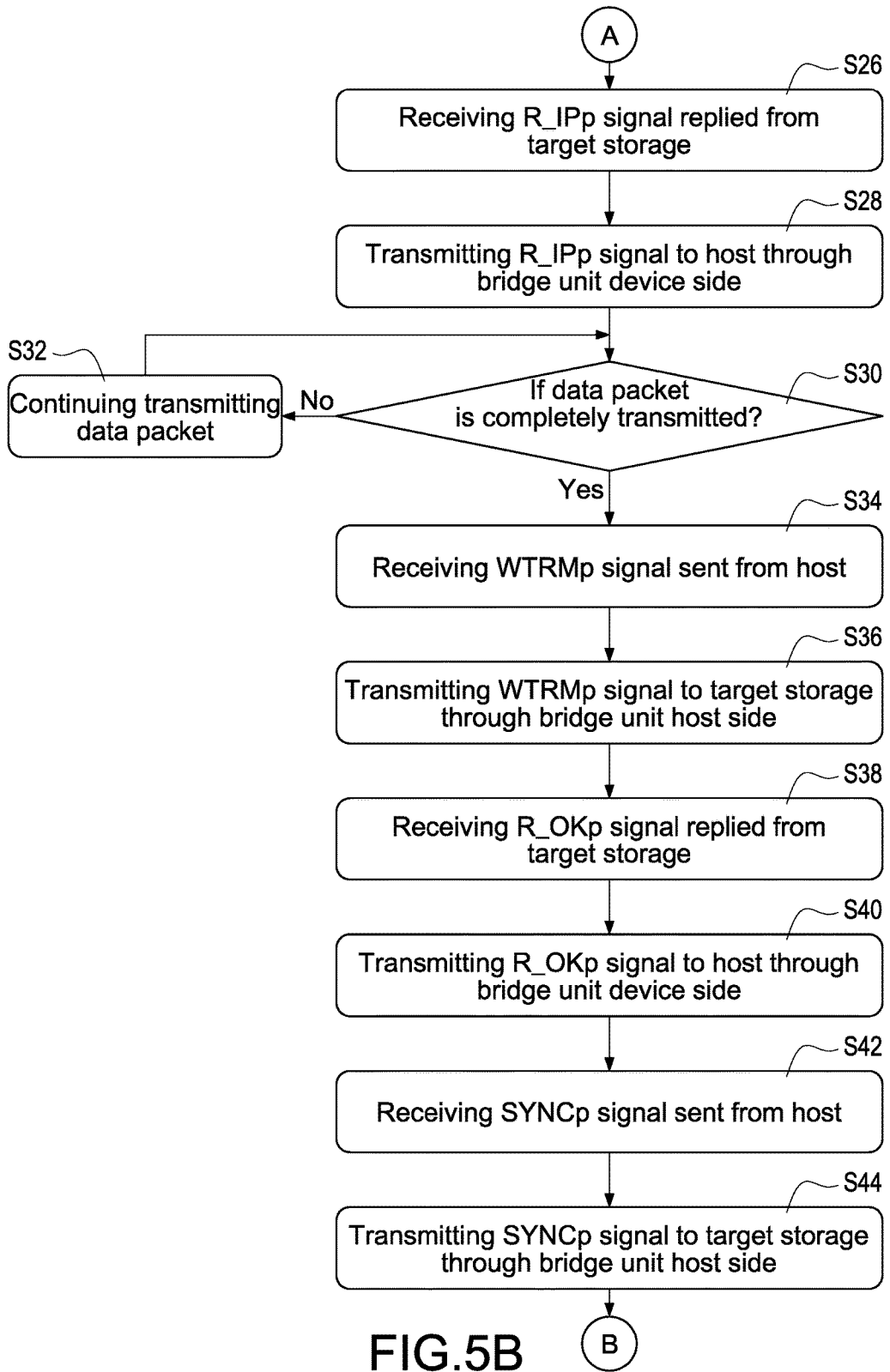
FIG. 5B is a second handshaking flowchart of the first embodiment according to the present invention.
Figure 5C:
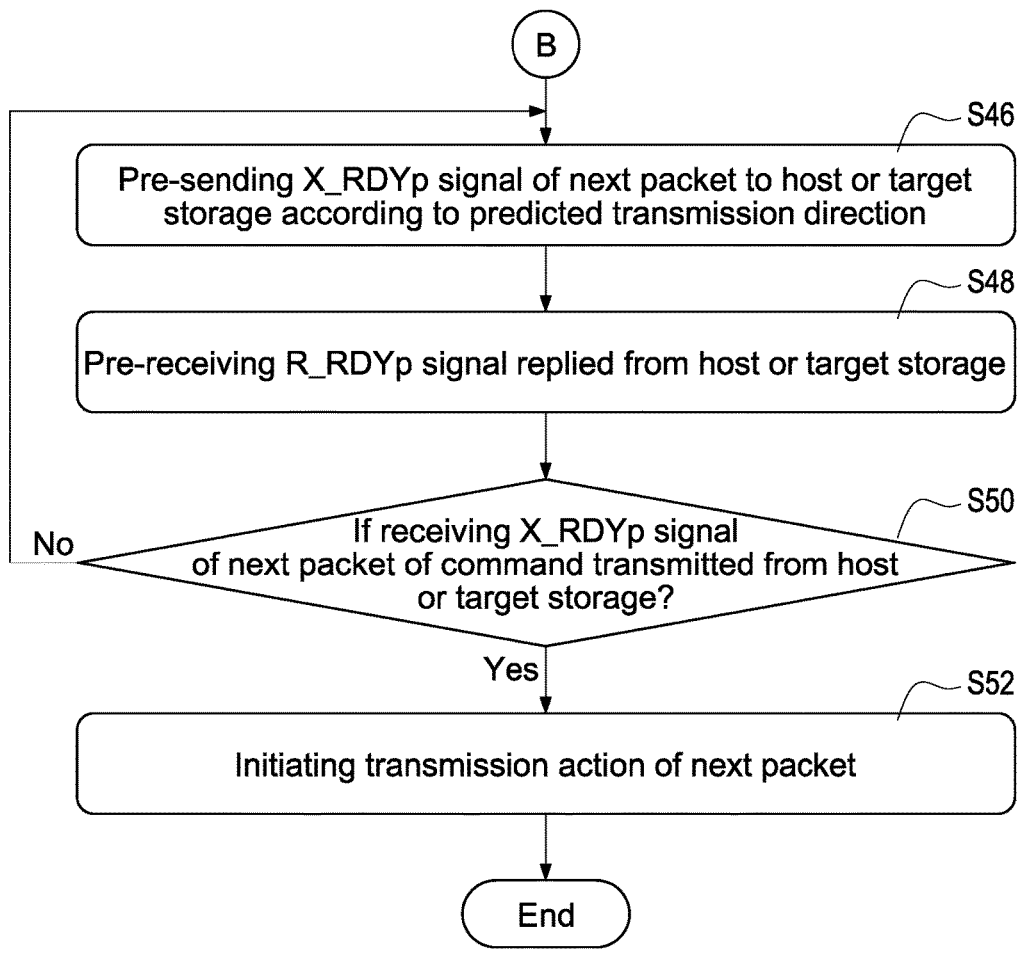
FIG. 5C is a third handshaking flowchart of the first embodiment according to the present invention.

FIG. 5A is a first handshaking flowchart of a first embodiment according to the present invention, FIG. 5B is a second handshaking flowchart of the first embodiment according to the present invention, FIG. 5C is a third handshaking flowchart of the first embodiment according to the present invention. In this embodiment, an instance is taken that the host 1 is communicating with a target storage of the multiple storages 421, 422. In this embodiment, the bridge unit 41 can be classified as a bridge unit device side and a bridge unit host side (such as bridge unit device side 411 and bridge unit host side 412 shown in FIG. 7) according to its functionality, wherein the bridge unit device side 411 is used to communicate with the host 1, and the bridge unit host side 412 is used to communicate with the target storage.

First, the bridge unit 41 determines if the bus 40 is in an idle state (step S10), wherein, the idle state indicates that the previously-received commands are already executed completely and no other command is transmitting or executing.

If the bus 40 is not in the idle state, the bridge unit 41 processes data and commands transmitted through the bus 40. If the bus 40 is in the idle state, it indicates that the transmission direction of next signal is bound to be transmitted from the host 1 to the hybrid HDD 4. As a result, the bridge unit 41 pre-sends a transmission data ready (X_RDYp) signal to the target storage through the bridge unit host side 412 (step S12), and pre-receives a receiver ready (R_RDYp) signal replied from the target storage (step S14).

After the step S14, the bridge unit 41 determines if the $X\_RDY_p$ signal of a packet of a command sent from the host 1 is received (step S16). In this embodiment, the command is a read command or a write command, which is composed of several packets, and the packet described in the above step S16 is a first packet of the command.

If the bridge unit 41 does not receive the $X\_RDY_p$ signal, the method re-executes the step S12 and the step S14. If the bridge unit 41 does receive the $X\_RDY_p$ signal sent from the host 1, because the bridge unit 41 has already transmitted the $X\_RDY_p$ signal and the $R\_RDY_p$ signal with the target storage, the bridge unit 41 will directly notify the bridge unit device side 411 to reply the $R\_RDY_p$ signal to the host 1 (step S18). Therefore, the host 1 can immediately receive the $R\_RDY_p$ signal right after it initiates the transmission action of the packet, so as to save the time required by the bridge unit 41 to transmit the $X\_RDY_p$ signal to the target storage, the time required by the target storage to reply the $R\_RDY_p$ signal and the time required by the bridge unit 41 to transmit the received $R\_RDY_p$ signal back to the host 1 after the host 1 initiates the transmission action of the packet.

After the step S18, the bridge unit 41 then receives a data packet (Data) of the packet sent from the host 1 (step S20), and transmits the data packet to the target storage through the bridge unit host side 412 (step S22).

It should be mentioned that the data packet of the first packet (header packet) of the command mainly records format and type of the command, in this embodiment, the bridge unit 41 can confirm the command type (such as the read command or the write command) of the command according to the content of the data packet after receiving the data packet of the packet transmitted from the host 1, so as to predict the transmission direction of subsequently transmitted packets of the command according to the command type (step S24). The above step S22 and step S24 do not have an execution order, the bridge unit 41 can execute the step S22 first or the step S24 first, not limited thereto.

Next, as shown in FIG. 5B, after the target storage receives the data packet, the bridge unit 41 can receive a reception in progress ($R\_IP_p$) signal replied from the target storage (step S26), and the bridge unit 41 then transmits the $R\_IP_p$ signal to the host 1 through the bridge unit device side 411 (step S28). It should be mentioned that the entire transmission action of the packet is not affected by the transmitting and the receiving of the $R\_IP_p$ signal, so the step S26 and the step S28 can be dispensed with. Also, even the step S26 and the step S28 are executed, the transmission time of the $R\_IP_p$ signal is not counted in the total transmission time of the packet.

After receiving the data packet, the bridge unit 41 determines if the data packet is completely transmitted (step S30), and it continues transmitting the data packet before the data packet is completely transmitted. In particularly, the step S32 is to continue receiving the data packet from the host 1, and continues transmitting the data packet to the target storage through the bridge unit host side 412.

After completely transmitting the data packet, the bridge unit 41 receives a wait for frame termination ($WTRM_p$) signal of the packet sent from the host 1 (step S34), and it then transmits the $WTRM_p$ signal to the target storage through the bridge unit host side 412 (step S36). After the target storage receives the $WTRM_p$ signal, the bridge unit 41 can receive a reception with no error ($R\_OK_p$) signal replied from the target storage (step S38). After the step S38, the bridge unit 41 then transmits the $R\_OK_p$ signal to the host 1 through the bridge unit device side 411 (step S40).

After the host 1 receives the R_OKp signal, the bridge unit 41 can receive a synchronization (SYNCp) signal sent from the host 1 (step S42), and it then transmits the SYNCp signal to the target storage through the bridge unit host side 412 (step S44), so as to end the transmission action of the packet. It should be mentioned that the SYNCp signal is only used to indicate the end of the transmission action of the packet; however, the SYNCp signal itself is not a part of the packet.

As shown in FIG. 5C, after completely transmitting the packet (such as the aforementioned first packet of the command), the bridge unit 41 can pre-send an $X\_RDY_p$ signal of next packet of the same command to the host 1 or the target storage according to the transmission direction of the next packet (such as the second packet of the same command) which is predicted in the step S24 (step S46), and pre-receives a $R\_RDY_p$ signal replied from the host 1 or the target storage (step S48).

Figure 6A:
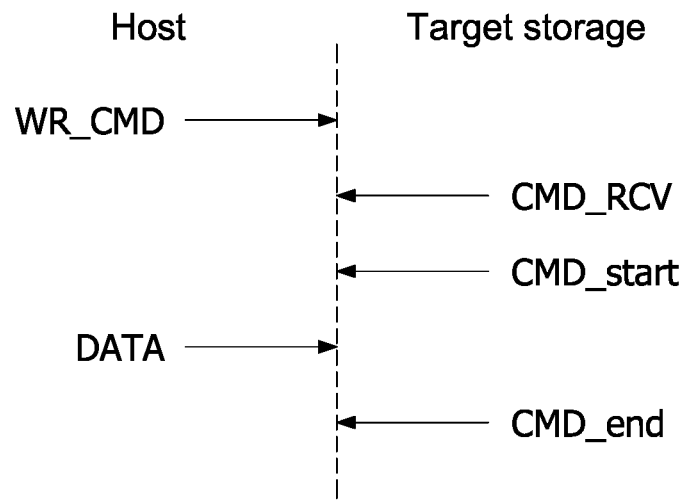
FIG. 6A is a schematic view showing packet transmission order of write command of a first embodiment according to the present invention.
Figure 6B:
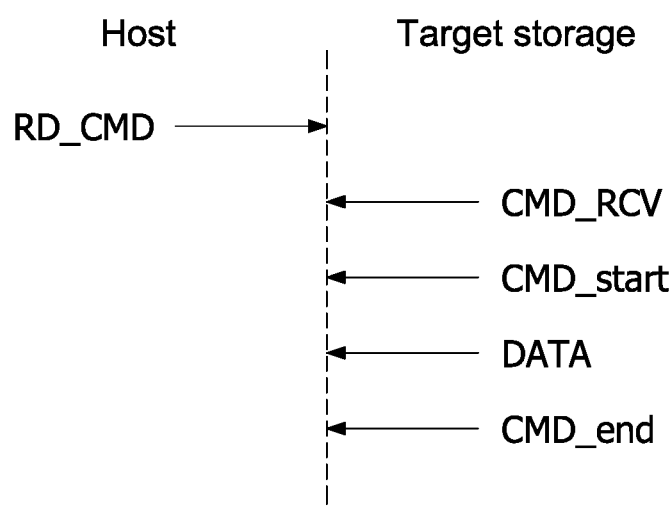
FIG. 6B is a schematic view showing packet transmission order of read command of a first embodiment according to the present invention.

FIG. 6A is a schematic view showing packet transmission order of write command of a first embodiment according to the present invention, FIG. 6B is a schematic view showing packet transmission order of read command of a first embodiment according to the present invention.

As shown in FIG. 6A, a write command comprises a plurality of packets, the plurality of packets comprises, in order, a WR_CMD packet transmitted from the host 1 to the target storage, a CMD_RCV packet transmitted from the target storage to the host 1, a CMD_start packet transmitted from the target storage to the host 1, a write data packet transmitted from the host 1 to the target storage, and a CMD_end packet transmitted from the target storage to the host 1.

As shown in FIG. 6B, a read command comprises a plurality of packets, the plurality of packets comprises, in order, a RD_CMD packet transmitted from the host 1 to the target storage, a CMD_RCV packet transmitted from the target storage to the host 1, a CMD_start packet transmitted from the target storage to the host 1, a read data packet transmitted from the target storage to the host 1, and a CMD_end packet transmitted from the target storage to the host 1.

In this embodiment, the bridge unit 41 pre-records the transmission order and the transmission direction of the plurality of packets of the write command and the read command. As a result, after confirming the command as the write command or the read command in the step S24, the bridge unit 41 can predict what the following transmitted packets are, and what the transmission directions of the following transmitted packets are.

For an instance, if the current transmitted packet is the WR_CMD packet of the write command, then after the step S44, the bridge unit 41 substitutes the target storage to pre-send an X_RDY$_p$ signal of next packet (i.e., the CMD_RCV packet) of the same write command to the host 1, and pre-receives a R_RDY$_p$ signal replied from the host 1. Therefore, whenever the target storage initiates the transmission action of the CMD_RCV packet, it can immediately receive the corresponding R_RDY$_p$ signal, so as to effectively reduce the total transmission time of transmitting the CMD_RCV packet.

For other instance, if the current transmitted packet is the CMD_start packet of the write command, then after the step S44, the bridge unit 41 substitutes the host 1 to pre-send an X_RDY$_p$ signal of next packet (i.e., the write data packet) of the same write command to the target storage, and pre-receives a R_RDY$_p$ signal replied from the target storage. Therefore, whenever the host 1 initiates the transmission action of the write data packet, it can immediately receive the corresponding R_RDY$_p$ signal, so as to effectively reduce the total transmission time of transmitting the write data packet.

Please refer to FIG. 5C again. After the step S48, the bridge unit 41 determines if the X_RDY$_p$ signal of the next packet of the command transmitted from the host 1 or the target storage (i.e., the initiator of the next packet) is received or not (step S50). If the bridge unit 41 does not receive the X_RDY$_p$ signal of the next packet transmitted from the host 1 or the target storage, the method re-executes the step S46 and the step S48.

If the bridge unit 41 does receive the X_RDY$_p$ signal of the next packet transmitted from the host 1 or the target storage, the bridge unit 41 directly replies the corresponding R_RDY$_p$ signal to the host 1 through the bridge unit device side 411 or to the target storage through the bridge unit host side 412, so as to initiate the transmission action of transmitting the next packet (step S52).

According to the handshake procedure shown in FIG. 5A, FIG. 5B and FIG. 5C, the bridge unit 41 can pre-initiate the transmission action of each packet, so as to effectively reduce the transmission time of each packet (i.e., reduce the handshaking time).

Figure 7:
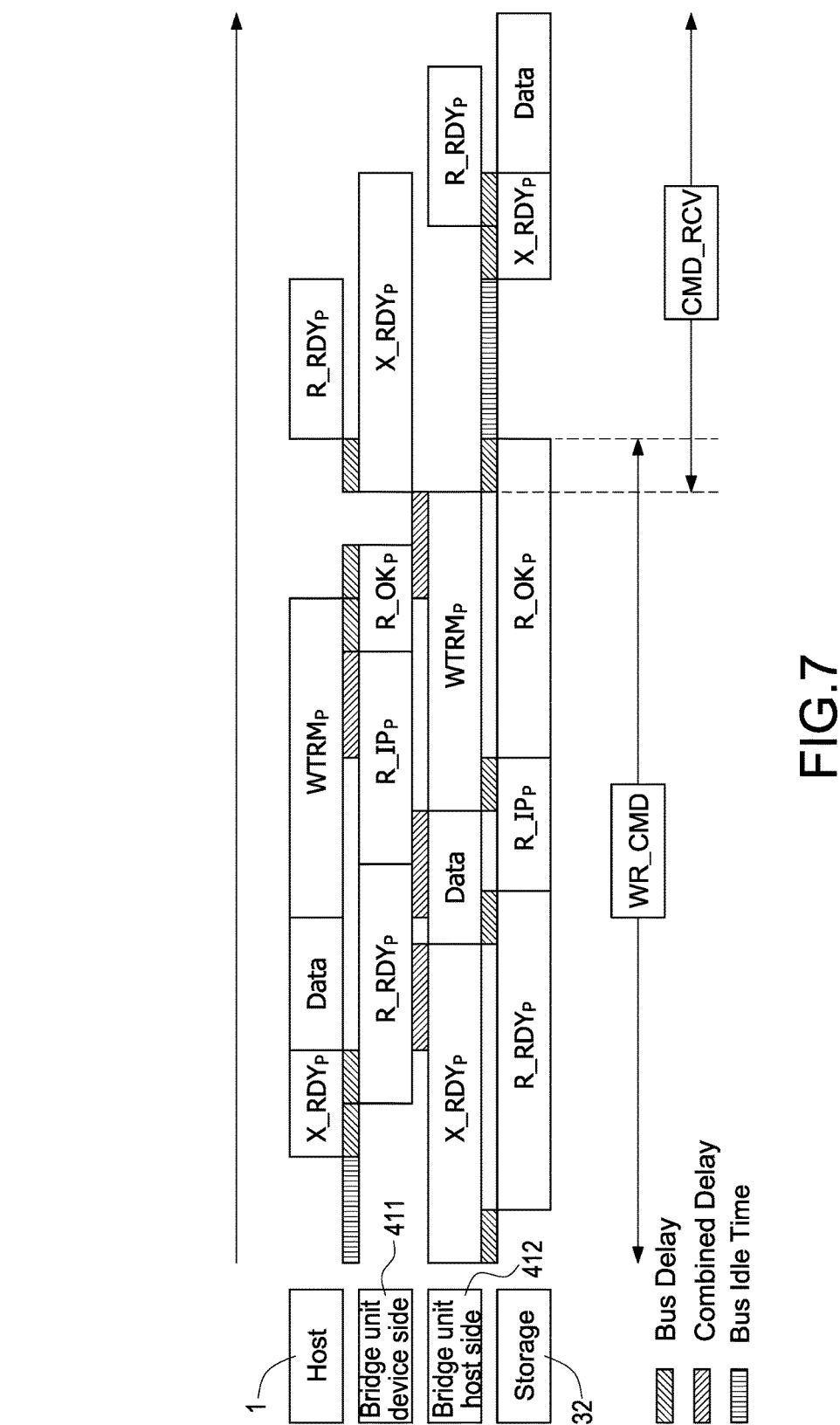
FIG. 7 is a time sequence diagram showing packet transmission of a first embodiment according to the present invention.

FIG. 7 is a time sequence diagram showing packet transmission of a first embodiment according to the present invention. In the embodiment shown in FIG. 7, an instance is taken that the host 1 transmits the WR_CMD packet (first packet) of the write command to the target storage.

As shown in FIG. 7, before the host 1 initiates the transmission action of the packet, the bus 40 is considered as in an idle state, so the bridge unit 41 can determine that next signal must be sent by the host 1. Accordingly, when the bus 40 is in the idle state, the bridge unit 41 pre-sends an X_RDY$_p$ signal to the target storage through the bridge unit host side 412, and the target storage can receive the X_RDY$_p$ signal after a first bus delay.

Next, the target storage replies a corresponding R_RDY$_p$ signal. Because the host 1, at the time, does not initiate the transmission action of the packet yet, the transmission time of transmitting the aforementioned X_RDY$_p$ signal and R_RDY$_p$ signal are not counted in the transmission time of the packet.

After initiating the transmission action of the packet, the host 1 first transmits the X_RDY$_p$ signal of the packet to the bridge unit 41, and the bridge unit 41 can receive the X_RDY$_p$ signal transmitted from the host 1 after a second bus delay. Next, the bridge unit 41 directly replies the R_RDY$_p$ signal to the host 1 through the bridge unit device side 411, and the host 1 can receive the R_RDY$_p$ signal after a third bus delay.

After receiving the R_RDY$_p$ signal, the host 1 then transmits a data packet (Data) of the packet to the bridge unit 41, and the bridge unit 41 can receive the data packet after a combined delay (a first combined delay). In this embodiment, the combined delay is the sum of a bus delay during which the host 1 transmits signal to the bridge unit 41 and a delay of the bridge unit 41 itself.

After receiving the data packet, the bridge unit 41 transmits the data packet to the target storage through the bridge unit host side 412, and the target storage can receive the data packet after a fourth bus delay. After receiving the data packet, the target storage then replies a corresponding R_IP$_p$ signal to the bridge unit 41. After receiving the R_IP$_p$ signal, the bridge unit 41 transmits the R_IP$_p$ signal to the host 1 through the bridge unit device side 411. However, the transmission action of the packet is not affected by the transmitting and the receiving of the R_IP$_p$ signal, so it is not counted in the total transmission time of the packet.

After the data packet is completely transmitted, the host 1 then transmits a WTRM$_p$ signal of the packet to the bridge unit 41, and the bridge unit 41 can receive the WTRM$_p$ signal after a second combined delay. Next, the bridge unit 41 transmits the WTRM$_p$ signal to the target storage through the bridge unit host side 412, and the target storage can receive the WTRM$_p$ signal after a fifth bus delay.

After receiving the WTRM$_p$ signal, the target storage replies an R_OK$_p$ signal to the bridge unit 41, and the bridge unit 41 can receive the R_OK$_p$ signal after a third combined delay. The bridge unit 41 then transmits the R_OK$_p$ signal to the host 1 through the bridge unit device side 411, and the host 1 can receive the R_OK$_p$ signal after a sixth bus delay.

After receiving the R_OK$_p$ signal, the host 1 then transmits a SYNC$_p$ signal (not shown) to the bridge unit 41. Next, the bridge unit device side 411 can receive the SYNC$_p$ signal after a seventh bus delay, so as to complete the communication with the host 1. Furthermore, the bridge unit host side 412 can receive the SYNC$_p$ signal after a fourth combined delay, and then transmits the SYNC$_p$ signal to the target storage. The target storage can receive the SYNC$_p$ signal after a eighth bus delay, and then ends the transmission action of the packet.

Figure 1A:
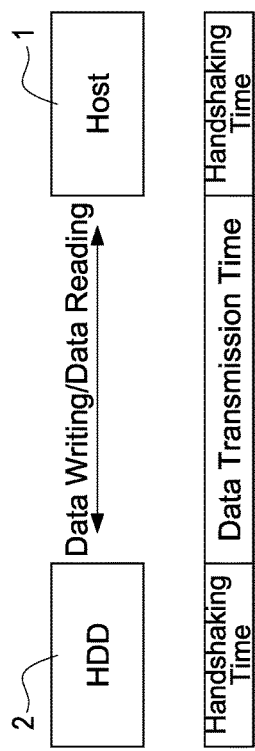
FIG. 1A is a schematic view showing data accessing of prior art.
Figure 1B:
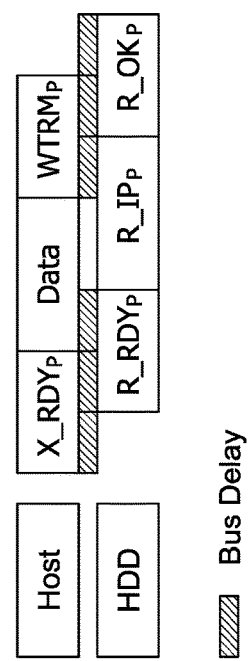
FIG. 1B is a time sequence diagram showing packet transmission of prior art.
Figure 2:
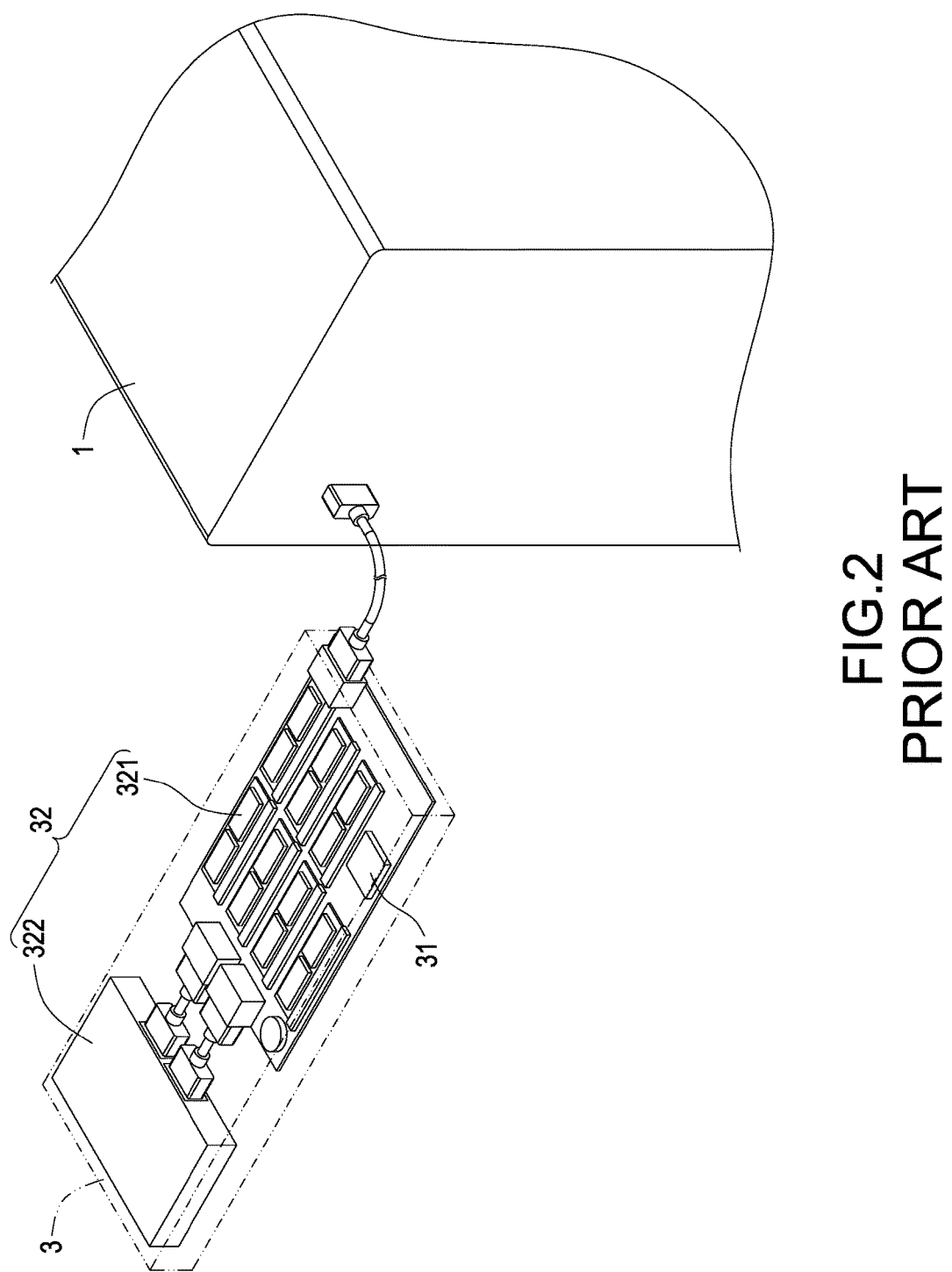
FIG. 2 is a schematic view of hybrid hard-disk drive of related art.
Figure 3:
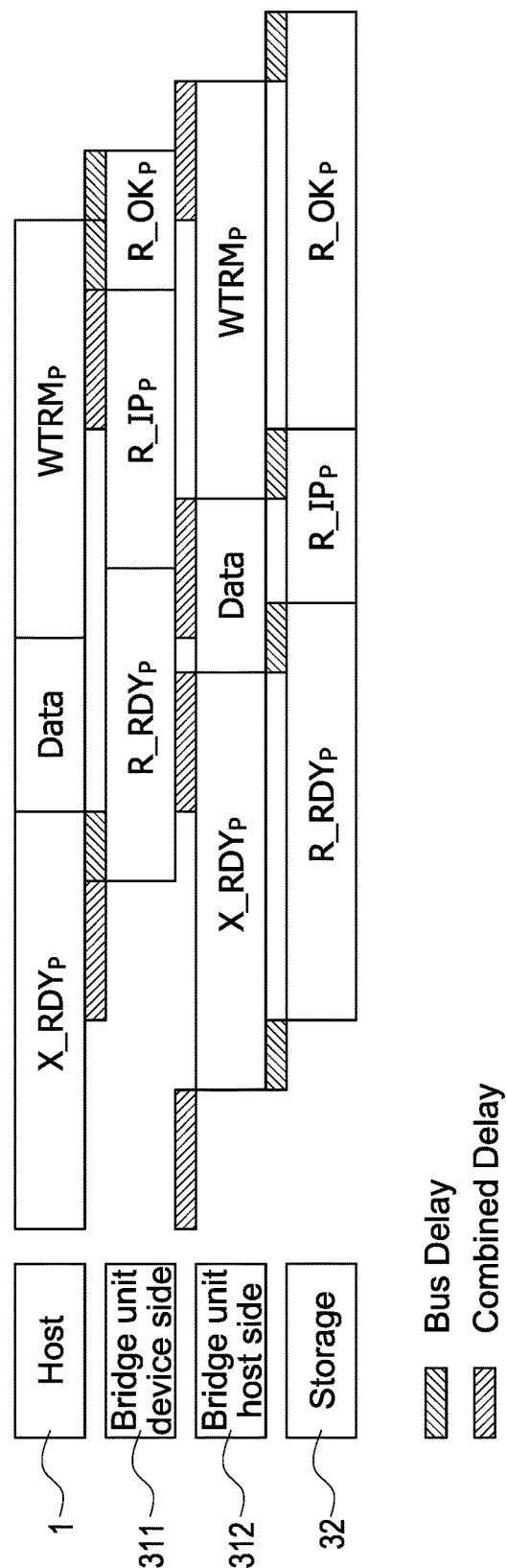
FIG. 3 is a time sequence diagram showing packet transmission of related art.

In this embodiment, the first bus delay occurs before the host 1 actually initiates the transmission action of the packet, so it is not counted in the transmission time of the packet. Also, the first combined delay and the fourth bus delay are overlapped with the transmission time of the data packet, so they are not counted in the transmission time of the packet. Furthermore, the seventh bus delay is overlapped with the fourth combined delay, so the seventh bus delay is not counted in the transmission time of the packet. Accordingly, the total transmission time of the packet is the sum of the second bus delay, the third bus delay, the fifth bus delay, the sixth bus delay, the eighth bus delay, the second combined delay, the third combined delay, the fourth combined delay and the transmission time of the data packet. That is to say, the handshaking time of the packet only comprises five bus delays and three combined delays, which is shorter than that of the handshaking method adopted by the related art as shown in FIG. 3.

In particular, according to inventor's practice, the following data can be obtained if using the handshaking method of the present invention to execute data reading and data writing:

| Data Size/Read or Write | No Bridge Unit | With Bridge Unit | Ratio |
|---|---|---|---|
| 512 Byte/Read | 265K IOPS | 200K IOPS | 0.754717 |
| 512 Byte/Write | 210K IOPS | 174K IOPS | 0.828571 |
| 4K Byte/Read | 101K IOPS | 90.5K IOPS | 0.89604 |
| 4K Byte/Write | 92K IOPS | 84.8K IOPS | 0.921739 |
| 32K Byte/Read | 548 MB/s | 530 MB/s | 0.967153 |
| 32K Byte/Write | 524 MB/s | 505 MB/s | 0.96374 |
| 128K Byte/Read | 565 MB/s | 552 MB/s | 0.976991 |
| 128K Byte/Write | 540 MB/s | 525 MB/s | 0.972222 |

As shown in the above table, by using the handshaking method disclosed in the present invention, the read/write speed of the hybrid HDD 4 in small size of data is about 0.75 time of a single HDD (i.e., no bridge unit). Also, the read/write speed of the hybrid HDD 4 in big size of data is about 0.97 time of a single HDD, which is almost the same as the read/write speed of reading/writing the single HDD regularly.

Generally, after the WR_CMD packet is completely transmitted, the target storage will initiate the transmission action of the CMD_RCV packet (next packet) in a while, and it will cause a little gap of bus delay. As a result, the total processing time of the command is extended.

As described above, the bridge unit 41 of the present invention can determine the command is a write command or not according to the data packet of the first packet after the idle state, so as to predict the transmission directions of the afterward transmitted packets. As a result, as shown in FIG. 7, when the $SYNC_p$ signal is completely transmitted, the bridge unit 41 can directly pre-send an $X\_RDY_p$ signal of next packet (the CMD_RCV packet in this embodiment) to the host 1 through the bridge unit device side 411, and then receives an $R\_RDY_p$ signal replied from the host 1.

Therefore, after the target storage actually initiates the transmission action of the CMD_RCV packet, it can immediately receive the $R\_RDY_p$ signal replied from the bridge unit host side 412, so as to reduce the transmission time of the CMD_RCV packet. Also, the instance taken in FIG. 7 is the WR_CMD packet and the CMD_RCV packet of the write command, however, the handshaking method of the present invention is appropriate for all packets of both write command and read command, not limited thereto.

Figure 8:
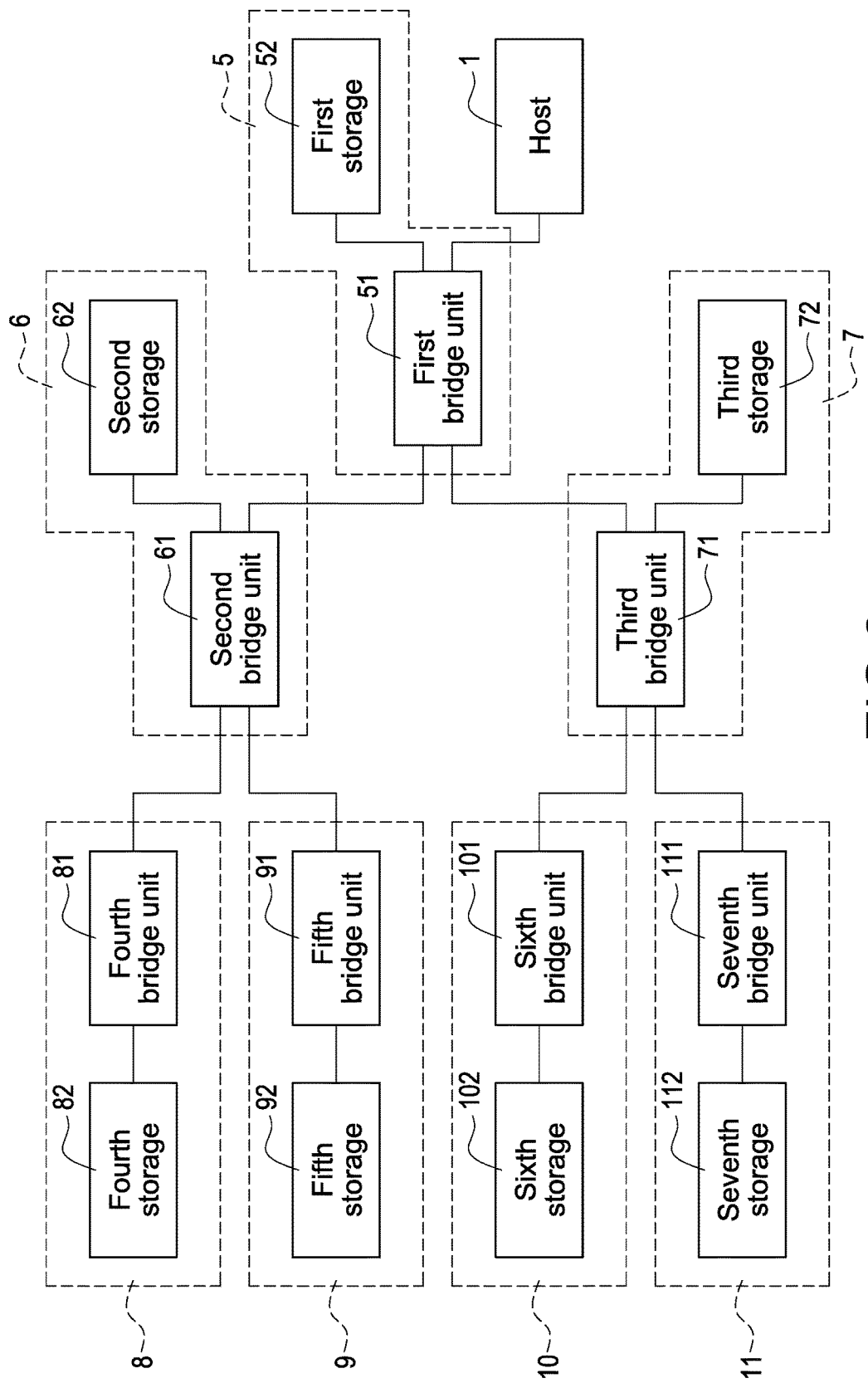
FIG. 8 is a schematic view showing serial connection of hybrid hard-disk drives of a first embodiment according to the present invention.

FIG. 8 is a schematic view showing serial connection of hybrid hard-disk drives of a first embodiment according to the present invention. In this embodiment, the hybrid HDD 4 can further comprise an extended interface (not shown), and it can connect with an extended bus through the extended interface, and connects with other hybrid HDD(s) through the extended bus. Therefore, the total amount of the HDDs can be extended.

As shown in FIG. 8, a first hybrid HDD 5 comprises a first bridge unit 51 and a first storage unit 52 connected with the first bridge unit 51, and the first hybrid HDD 5 connects with the host 1 through the first bridge unit 51.

The first hybrid HDD 5 connects with a second hybrid HDD 6 and a third hybrid HDD 7 through its extended bus. The second hybrid HDD 6 comprises a second bridge unit 61 and a second storage 62, and the third hybrid HDD 7 comprises a third bridge unit 71 and a third storage 72.

The second hybrid HDD 6 connects with a fourth hybrid HDD 8 and a fifth hybrid HDD 9 through its extended bus, and the third hybrid HDD 7 connects with a sixth hybrid HDD 10 and a seventh hybrid HDD 11 through its extended bus. The fourth hybrid HDD 8 comprises a fourth bridge unit 81 and a fourth storage 82, the fifth hybrid HDD 9 comprises a fifth bridge unit 91 and a fifth storage 92, the sixth hybrid HDD 10 comprises a sixth bridge unit 101 and a sixth storage unit 102, and the seventh hybrid HDD 11 comprises a seventh bridge unit 111 and a seventh storage 112.

In this embodiment, after connecting with the first hybrid HDD 5, the host 1 can obtain a HDD array, wherein the amount of the HDD array is the sum of the amounts of plurality of the storages 52, 62, 72, 82, 92, 102 and 112. If the host 1 reads/writes the HDD array, all of the bridge units 51, 61, 71, 81, 91, 101 and 111 can adopt the handshaking method of the present invention to communicate with the host 1 and each of the plurality of storages 52, 62, 72, 82, 92, 102 and 112. If we use the lowest number discussed above (0.75 time) to execute a calculation, the read/write speed of the host 1 in accessing the aforementioned HDD array will be 0.67 time (1+2*0.75+4*0.75*0.75) of the read/write speed of accessing a single HDD regularly, and it is much faster than that of accessing a traditional HDD array.

As the skilled person will appreciate, various changes and modifications can be made to the described embodiment. It is intended to include all such variations, modifications and equivalents which fall within the scope of the present invention, as defined in the accompanying claims.

What is claimed is:

1. A handshaking method of hybrid hard-disk drive, wherein the hybrid hard-disk drive (HDD) connected with a host and comprising a bridge unit and multiple storages, the bridge unit comprising a bridge unit device side communicating with the host and a bridge unit host side communicating with a target storage of the multiple storages, the handshaking method comprising:
   a) determining if a bus is in an idle state, wherein the hybrid HDD connects with the host through the bus;
   b) pre-sending a transmission data ready ($X\_RDY_P$) signal to the target storage through the bridge unit host side when the bus is in the idle state;
   c) after the step b, receiving a receiver ready ($R\_RDY_P$) signal replied from the target storage;
   d) determining if the $X\_RDY_P$ signal of a packet of a command sent from the host is received or not;
   e) replying the $R\_RDY_P$ signal directly to the host through the bridge unit device side after receiving the $X\_RDY_P$ signal sent from the host;
   f) after the step e, receiving a data packet sent from the host;

g) after the step f, transmitting the data packet to the target storage through the bridge unit host side;

h) after completely transmitting the data packet, receiving a wait for frame termination ($WTRM_P$) signal sent from the host, and transmitting the $WTRM_P$ signal to the target storage through the bridge unit host side;

i) after the step h, receiving a reception with no error ($R\_OK_P$) signal sent from the target storage, and transmitting the $R\_OK_P$ signal to the host through the bridge unit device side;

j) after the step i, receiving a synchronization ($SYNC_P$) signal sent from the host, and transmitting the $SYNC_P$ signal to the target storage through the bridge unit host side in order to end a transmission action of transmitting the packet; and k) after the step d, re-executing the step b and the step c before receiving the $X\_RDY_P$ signal sent from the host.

2. The handshaking method in claim 1, further comprising following steps:

l) after the step g, receiving a reception in Progress ($R\_IP_P$) signal replied from the target storage; and m) after the step l, transmitting the $R\_IP_P$ signal to the host through the bridge unit device side.

3. The handshaking method in claim 1, further comprising following steps:

n) after the step g, determining if the data packet is completely transmitted; and o) re-executing the step f and the step g before the data packet is completed transmitting.

4. The handshaking method in claim 1, further comprising a step p) after the step f, confirming a type of the command according to a content of the data packet and predicting transmission directions of a plurality of afterward transmitted packets of the command according to the type of the command.

5. The handshaking method in claim 4, further comprising following steps:

q) after the step j, pre-sending the $X\_RDY_P$ signal of a next packet of the command to the host or the target storage according to the transmission direction of the next packet predicted in the step p; and r) receiving the $R\_RDY_P$ signal replied from the host or the target storage.

6. The handshaking method in claim 5, further comprising following steps:

s) after the step r, determining if receiving the $X\_RDY_P$ of the next packet of the command sent from the host or the target storage;

t) re-executing the step q and the step r before receiving the $X\_RDY_P$ signal sent from the host or the target storage; and u) replying directly the $R\_RDY_P$ signal to initiate a transmission action of the next packet after receiving the $X\_RDY_P$ signal sent from the host or the target storage.

7. The handshaking method in claim 4, wherein the command is a write command, the plurality of packets comprises, in order, a WR_CMD packet sent from the host to the target storage, a CMD_RCV packet sent from the target storage to the host, a CMD_start packet sent from the target storage to the host, a write data packet sent from the host to the target storage, and a CMD_end packet sent from the target storage to the host.

8. The handshaking method in claim 4, wherein the command is a read command, the plurality of packets comprises, in order, a RD_CMD packet sent from the host to the target storage, a CMD_RCV packet sent from the target storage to the host, a CMD_start packet sent from the target storage to the host, a read data packet sent from the target storage to the host, and a CMD_end packet sent from the target storage to the host.

9. The handshaking method in claim 4, wherein the multiple storages are selected from a group composed of hard-disk drive, solid-state drive and volatile memory.

* * * * *